(12) United States Patent
Wang et al.

(10) Patent No.: US 9,814,055 B2
(45) Date of Patent: Nov. 7, 2017

(54) DISTRIBUTED CHANNEL SELECTION FOR WIRELESS NETWORKS

(71) Applicant: AEROHIVE NETWORKS, INC., Milpitas, CA (US)

(72) Inventors: Huizhao Wang, San Jose, CA (US); Chris Scheers, Palo Alto, CA (US); Changming Liu, Cupertino, CA (US)

(73) Assignee: Aerohive Networks, Inc., Milpitas, CA (US)

( * ) Notice: Subject to any disclaimer, the term of this patent is extended or adjusted under 35 U.S.C. 154(b) by 0 days.

(21) Appl. No.: 14/663,028

(22) Filed: Mar. 19, 2015

(65) Prior Publication Data
US 2015/0195845 A1    Jul. 9, 2015

Related U.S. Application Data

(63) Continuation of application No. 12/877,048, filed on Sep. 7, 2010, now Pat. No. 9,002,277.

(51) Int. Cl.
*H04W 72/08* (2009.01)
*H04W 16/10* (2009.01)
(Continued)

(52) U.S. Cl.
CPC ......... *H04W 72/085* (2013.01); *H04W 16/10* (2013.01); *H04W 24/02* (2013.01); *H04W 48/16* (2013.01)

(58) Field of Classification Search
None
See application file for complete search history.

(56) References Cited

U.S. PATENT DOCUMENTS

| 5,471,671 A | 11/1995 | Wang et al. |
| 5,697,059 A | 12/1997 | Carney |

(Continued)

FOREIGN PATENT DOCUMENTS

| EP | 0940999 | 9/1999 |
| EP | 1732276 | 12/2006 |

(Continued)

OTHER PUBLICATIONS

Wu, Haitao et al., "Layer 2.5 SoftMAC: End-System Based Media Streaming Support on Home Networks," IEEE Global Telecommunications Conference (GLOBECOM '05), vol. 1, pp. 235-239, Nov. 2005.

(Continued)

*Primary Examiner* — Chi H Pham
*Assistant Examiner* — Vladislav Agureyev
(74) *Attorney, Agent, or Firm* — Sheppard, Mullin, Richter & Hampton LLP

(57) ABSTRACT

Wireless networking devices scan for available channels and gather data about the channels and the RF environment. Using this information, each wireless networking device determines a cost value for each available channel and a quality value for its overall RF neighborhood. Each wireless networking device select the channel with the best cost value as a candidate channel for use. The wireless networking devices may submit channel requests to the arbiter for approval. If two or more wireless networking devices are requesting the same channel, the arbiter assigns the channel to the wireless networking device with the worst RF neighborhood quality. The arbiter informs the wireless networking devices if their channel requests are approved. If a wireless networking device's channel request is not approved, the wireless networking device will rescan the remaining avail- (Continued)

able channels to select a different candidate channel to be approved.

20 Claims, 3 Drawing Sheets

(51) Int. Cl.
*H04W 48/16* (2009.01)
*H04W 24/02* (2009.01)

(56) References Cited

U.S. PATENT DOCUMENTS

| | | | |
|---|---|---|---|
| 5,726,984 A | 3/1998 | Kubler et al. | |
| 5,956,643 A | 9/1999 | Benveniste | |
| 6,061,799 A | 5/2000 | Eldridge et al. | |
| 6,112,092 A | 8/2000 | Benveniste | |
| 6,154,655 A | 11/2000 | Borst et al. | |
| 6,201,792 B1 | 3/2001 | Lahat | |
| 6,314,294 B1 | 11/2001 | Benveniste | |
| 6,473,413 B1 | 10/2002 | Chiou et al. | |
| 6,496,699 B2 | 12/2002 | Benveniste | |
| 6,519,461 B1 | 2/2003 | Andersson et al. | |
| 6,628,623 B1 | 9/2003 | Noy | |
| 6,628,938 B1 | 9/2003 | Rachabathuni et al. | |
| 6,636,498 B1 | 10/2003 | Leung | |
| 6,775,549 B2 | 8/2004 | Benveniste | |
| 6,865,393 B1 | 3/2005 | Baum et al. | |
| 6,957,067 B1 | 10/2005 | Iyer et al. | |
| 7,002,943 B2 | 2/2006 | Bhagwat et al. | |
| 7,057,566 B2 | 6/2006 | Theobold | |
| 7,085,224 B1 | 8/2006 | Oran | |
| 7,085,241 B1 | 8/2006 | O'Neill et al. | |
| 7,130,629 B1 | 10/2006 | Leung et al. | |
| 7,154,874 B2 | 12/2006 | Bhagwat et al. | |
| 7,164,667 B2 | 1/2007 | Rayment et al. | |
| 7,174,170 B2 | 2/2007 | Steer et al. | |
| 7,177,646 B2 | 2/2007 | O'Neill et al. | |
| 7,181,530 B1 | 2/2007 | Halasz et al. | |
| 7,216,365 B2 | 5/2007 | Bhagwat et al. | |
| 7,224,697 B2 * | 5/2007 | Banerjea | H04L 1/0001 370/329 |
| 7,251,238 B2 | 7/2007 | Joshi et al. | |
| 7,336,670 B1 | 2/2008 | Calhoun | |
| 7,339,914 B2 | 3/2008 | Bhagwat et al. | |
| 7,346,338 B1 | 3/2008 | Calhoun et al. | |
| 7,366,894 B1 | 4/2008 | Kalimuthu et al. | |
| 7,370,362 B2 | 5/2008 | Olson et al. | |
| 7,440,434 B2 | 10/2008 | Chaskar et al. | |
| 7,512,379 B2 | 3/2009 | Nguyen | |
| 7,536,723 B1 | 5/2009 | Bhagwat et al. | |
| 7,562,384 B1 | 7/2009 | Huang | |
| 7,593,356 B1 * | 9/2009 | Friday | H04W 72/082 370/230 |
| 7,656,822 B1 | 2/2010 | AbdelAziz et al. | |
| 7,706,789 B2 | 4/2010 | Qi et al. | |
| 7,716,370 B1 | 5/2010 | Devarapalli | |
| 7,751,393 B2 | 7/2010 | Chaskar et al. | |
| 7,768,952 B2 | 8/2010 | Lee | |
| 7,793,104 B2 | 9/2010 | Zheng et al. | |
| 7,804,808 B2 | 9/2010 | Bhagwat et al. | |
| 7,843,907 B1 | 11/2010 | Abou-Emara et al. | |
| 7,844,057 B2 | 11/2010 | Meier et al. | |
| 7,856,209 B1 | 12/2010 | Rawat | |
| 7,921,185 B2 | 4/2011 | Chawla et al. | |
| 7,949,342 B2 | 5/2011 | Cuffaro et al. | |
| 7,961,725 B2 | 6/2011 | Nagarajan et al. | |
| 7,970,894 B1 | 6/2011 | Patwardhan | |
| 8,000,308 B2 | 8/2011 | Dietrich et al. | |
| 8,069,483 B1 | 11/2011 | Matlock | |
| 8,219,688 B2 | 7/2012 | Wang | |
| 8,249,606 B1 | 8/2012 | Neophytou et al. | |
| 8,493,918 B2 | 7/2013 | Karaoguz et al. | |
| 8,789,191 B2 | 7/2014 | Bhagwat et al. | |
| 8,824,448 B1 | 9/2014 | Narayana et al. | |
| 8,948,046 B2 | 2/2015 | Kang et al. | |
| 9,003,527 B2 | 4/2015 | Bhagwat et al. | |
| 2001/0006508 A1 | 7/2001 | Pankaj et al. | |
| 2002/0012320 A1 | 1/2002 | Ogier et al. | |
| 2002/0021689 A1 | 2/2002 | Robbins et al. | |
| 2002/0071422 A1 | 6/2002 | Amicangioli | |
| 2002/0091813 A1 | 7/2002 | Lamberton et al. | |
| 2002/0116463 A1 | 8/2002 | Hart | |
| 2002/0128984 A1 | 9/2002 | Mehta et al. | |
| 2003/0005100 A1 | 1/2003 | Barnard et al. | |
| 2003/0039212 A1 | 2/2003 | Lloyd et al. | |
| 2003/0087629 A1 | 5/2003 | Juitt | |
| 2003/0104814 A1 | 6/2003 | Gwon et al. | |
| 2003/0129988 A1 | 7/2003 | Lee et al. | |
| 2003/0145091 A1 | 7/2003 | Peng et al. | |
| 2003/0179742 A1 | 9/2003 | Ogier et al. | |
| 2004/0003285 A1 | 1/2004 | Whelan et al. | |
| 2004/0013118 A1 | 1/2004 | Borella | |
| 2004/0022222 A1 | 2/2004 | Clisham | |
| 2004/0054774 A1 | 3/2004 | Barber et al. | |
| 2004/0064467 A1 | 4/2004 | Kola et al. | |
| 2004/0077341 A1 | 4/2004 | Chandranmenon et al. | |
| 2004/0103282 A1 | 5/2004 | Meier et al. | |
| 2004/0109466 A1 | 6/2004 | Van Ackere et al. | |
| 2004/0162037 A1 | 8/2004 | Shpak | |
| 2004/0185876 A1 | 9/2004 | Groenendaal et al. | |
| 2004/0192312 A1 | 9/2004 | Li et al. | |
| 2004/0196977 A1 | 10/2004 | Johnson et al. | |
| 2004/0236939 A1 | 11/2004 | Watanabe et al. | |
| 2004/0255028 A1 | 12/2004 | Chu et al. | |
| 2005/0053003 A1 | 3/2005 | Cain et al. | |
| 2005/0074015 A1 | 4/2005 | Chari et al. | |
| 2005/0099983 A1 | 5/2005 | Nakamura et al. | |
| 2005/0122946 A1 | 6/2005 | Won | |
| 2005/0154774 A1 | 7/2005 | Giaffreda et al. | |
| 2005/0207417 A1 | 9/2005 | Ogawa et al. | |
| 2005/0259682 A1 | 11/2005 | Yosef et al. | |
| 2005/0262266 A1 | 11/2005 | Wiberg et al. | |
| 2005/0265288 A1 * | 12/2005 | Liu | H04W 72/082 370/332 |
| 2005/0266848 A1 | 12/2005 | Kim | |
| 2006/0010250 A1 | 1/2006 | Eisl et al. | |
| 2006/0013179 A1 * | 1/2006 | Yamane | H04W 72/02 370/338 |
| 2006/0026289 A1 | 2/2006 | Lyndersay et al. | |
| 2006/0062250 A1 | 3/2006 | Payne, III | |
| 2006/0107050 A1 | 5/2006 | Shih | |
| 2006/0117018 A1 | 6/2006 | Christiansen et al. | |
| 2006/0140123 A1 | 6/2006 | Conner et al. | |
| 2006/0146748 A1 | 7/2006 | Ng et al. | |
| 2006/0146846 A1 | 7/2006 | Yarvis et al. | |
| 2006/0165015 A1 | 7/2006 | Melick et al. | |
| 2006/0187949 A1 | 8/2006 | Seshan et al. | |
| 2006/0221920 A1 | 10/2006 | Gopalakrishnan et al. | |
| 2006/0233128 A1 | 10/2006 | Sood et al. | |
| 2006/0234701 A1 | 10/2006 | Wang et al. | |
| 2006/0245442 A1 | 11/2006 | Srikrishna et al. | |
| 2006/0251256 A1 | 11/2006 | Asokan et al. | |
| 2006/0268802 A1 | 11/2006 | Faccin | |
| 2006/0294246 A1 | 12/2006 | Stieglitz et al. | |
| 2007/0004394 A1 | 1/2007 | Chu et al. | |
| 2007/0010231 A1 | 1/2007 | Du | |
| 2007/0025274 A1 | 2/2007 | Rahman et al. | |
| 2007/0025298 A1 | 2/2007 | Jung | |
| 2007/0049323 A1 | 3/2007 | Wang et al. | |
| 2007/0077937 A1 | 4/2007 | Ramakrishnan et al. | |
| 2007/0078663 A1 | 4/2007 | Grace | |
| 2007/0082656 A1 | 4/2007 | Stieglitz et al. | |
| 2007/0087756 A1 | 4/2007 | Hoffberg | |
| 2007/0091859 A1 | 4/2007 | Sethi et al. | |
| 2007/0115847 A1 | 5/2007 | Strutt et al. | |
| 2007/0116011 A1 | 5/2007 | Lim et al. | |
| 2007/0121947 A1 | 5/2007 | Sood et al. | |
| 2007/0133407 A1 | 6/2007 | Choi et al. | |
| 2007/0140191 A1 | 6/2007 | Kojima | |
| 2007/0150720 A1 | 6/2007 | Oh et al. | |
| 2007/0153741 A1 | 7/2007 | Blanchette et al. | |
| 2007/0156804 A1 | 7/2007 | Mo | |
| 2007/0160017 A1 | 7/2007 | Meier et al. | |

(56) References Cited

U.S. PATENT DOCUMENTS

| | | |
|---|---|---|
| 2007/0171885 A1 | 7/2007 | Bhagwat et al. |
| 2007/0192862 A1 | 8/2007 | Vermeulen et al. |
| 2007/0195761 A1 | 8/2007 | Tatar et al. |
| 2007/0247303 A1 | 10/2007 | Payton |
| 2007/0249324 A1 | 10/2007 | Jou et al. |
| 2007/0263532 A1 | 11/2007 | Mirtorabi et al. |
| 2007/0280481 A1 | 12/2007 | Eastlake et al. |
| 2007/0288997 A1 | 12/2007 | Meier et al. |
| 2008/0002642 A1 | 1/2008 | Borkar et al. |
| 2008/0022392 A1 | 1/2008 | Karpati et al. |
| 2008/0037552 A1 | 2/2008 | Dos Remedios et al. |
| 2008/0080369 A1 | 4/2008 | Sumioka |
| 2008/0080377 A1 | 4/2008 | Sasaki et al. |
| 2008/0090575 A1 | 4/2008 | Barak et al. |
| 2008/0095094 A1 | 4/2008 | Innami |
| 2008/0095163 A1* | 4/2008 | Chen ............... H04L 45/16 370/392 |
| 2008/0107027 A1 | 5/2008 | Allan et al. |
| 2008/0109879 A1 | 5/2008 | Bhagwat et al. |
| 2008/0130495 A1 | 6/2008 | Dos Remedios et al. |
| 2008/0146240 A1 | 6/2008 | Trudeau |
| 2008/0151751 A1 | 6/2008 | Ponnuswamy et al. |
| 2008/0159128 A1 | 7/2008 | Shaffer |
| 2008/0170527 A1 | 7/2008 | Lundsgaard et al. |
| 2008/0194271 A1 | 8/2008 | Bedekar et al. |
| 2008/0207215 A1 | 8/2008 | Chu et al. |
| 2008/0212562 A1 | 9/2008 | Bedekar et al. |
| 2008/0219286 A1* | 9/2008 | Ji ..................... H04L 12/413 370/445 |
| 2008/0225857 A1 | 9/2008 | Lange |
| 2008/0229095 A1 | 9/2008 | Kalimuthu et al. |
| 2008/0240128 A1 | 10/2008 | Elrod |
| 2008/0253370 A1 | 10/2008 | Cremin et al. |
| 2008/0273520 A1 | 11/2008 | Kim et al. |
| 2008/0279161 A1 | 11/2008 | Stirbu et al. |
| 2009/0019521 A1 | 1/2009 | Vasudevan |
| 2009/0028052 A1 | 1/2009 | Strater et al. |
| 2009/0040989 A1* | 2/2009 | da Costa ............ H04L 41/0806 370/338 |
| 2009/0043901 A1 | 2/2009 | Mizikovsky et al. |
| 2009/0082025 A1 | 3/2009 | Song |
| 2009/0088152 A1 | 4/2009 | Orlassino |
| 2009/0097436 A1 | 4/2009 | Vasudevan et al. |
| 2009/0111468 A1 | 4/2009 | Burgess et al. |
| 2009/0113018 A1 | 4/2009 | Thomson et al. |
| 2009/0141692 A1 | 6/2009 | Kasslin et al. |
| 2009/0144740 A1 | 6/2009 | Gao |
| 2009/0168645 A1 | 7/2009 | Tester et al. |
| 2009/0172151 A1 | 7/2009 | Davis |
| 2009/0197597 A1 | 8/2009 | Kotecha |
| 2009/0207806 A1 | 8/2009 | Makela et al. |
| 2009/0239531 A1 | 9/2009 | Andreasen et al. |
| 2009/0240789 A1 | 9/2009 | Dandabany |
| 2009/0247170 A1 | 10/2009 | Balasubramanian et al. |
| 2009/0303883 A1 | 12/2009 | Kucharczyk et al. |
| 2009/0310557 A1 | 12/2009 | Shinozaki |
| 2010/0046368 A1 | 2/2010 | Kaempfer et al. |
| 2010/0057930 A1 | 3/2010 | DeHaan |
| 2010/0067379 A1* | 3/2010 | Zhao ............... H04L 41/147 370/235 |
| 2010/0112540 A1 | 5/2010 | Gross et al. |
| 2010/0115278 A1 | 5/2010 | Shen et al. |
| 2010/0115576 A1 | 5/2010 | Hale et al. |
| 2010/0132040 A1 | 5/2010 | Bhagwat et al. |
| 2010/0208614 A1 | 8/2010 | Harmatos |
| 2010/0228843 A1 | 9/2010 | Ok et al. |
| 2010/0240313 A1 | 9/2010 | Kawai |
| 2010/0254316 A1 | 10/2010 | Sendrowicz |
| 2010/0260091 A1 | 10/2010 | Seok |
| 2010/0290397 A1 | 11/2010 | Narayana et al. |
| 2010/0304738 A1 | 12/2010 | Lim et al. |
| 2010/0311420 A1 | 12/2010 | Reza et al. |
| 2010/0322217 A1 | 12/2010 | Jin et al. |
| 2010/0325720 A1 | 12/2010 | Etchegoyen |
| 2011/0004913 A1 | 1/2011 | Nagarajan et al. |
| 2011/0040867 A1 | 2/2011 | Kalbag |
| 2011/0051677 A1* | 3/2011 | Jetcheva ............ H04W 72/0486 370/329 |
| 2011/0055326 A1 | 3/2011 | Michaelis et al. |
| 2011/0055928 A1 | 3/2011 | Brindza |
| 2011/0058524 A1* | 3/2011 | Hart ................. H04W 72/082 370/329 |
| 2011/0064065 A1 | 3/2011 | Nakajima et al. |
| 2011/0085464 A1 | 4/2011 | Nordmark et al. |
| 2011/0182225 A1 | 7/2011 | Song et al. |
| 2011/0185231 A1 | 7/2011 | Balestrieri et al. |
| 2011/0258641 A1 | 10/2011 | Armstrong et al. |
| 2011/0292897 A1* | 12/2011 | Wu .................. H04W 72/0486 370/329 |
| 2012/0014386 A1 | 1/2012 | Xiong et al. |
| 2012/0290650 A1 | 11/2012 | Montuno et al. |
| 2013/0003729 A1 | 1/2013 | Raman et al. |
| 2013/0003739 A1 | 1/2013 | Raman et al. |
| 2013/0003747 A1 | 1/2013 | Raman et al. |
| 2013/0028158 A1 | 1/2013 | Lee et al. |
| 2013/0059570 A1 | 3/2013 | Hara et al. |
| 2013/0086403 A1 | 4/2013 | Jenne et al. |
| 2013/0103833 A1 | 4/2013 | Ringland et al. |
| 2013/0227306 A1 | 8/2013 | Santos et al. |
| 2013/0230020 A1* | 9/2013 | Backes ............... H04L 47/125 370/331 |
| 2013/0250811 A1 | 9/2013 | Vasseur et al. |
| 2014/0269327 A1 | 9/2014 | Fulknier et al. |
| 2014/0298467 A1 | 10/2014 | Bhagwat et al. |
| 2015/0120864 A1 | 4/2015 | Unnimadhavan et al. |

FOREIGN PATENT DOCUMENTS

| | | |
|---|---|---|
| EP | 1771026 | 4/2007 |
| EP | 1490773 | 1/2013 |
| WO | 0059251 | 10/2000 |
| WO | 2004042971 | 5/2004 |
| WO | 2006129287 | 12/2006 |
| WO | 2009141016 | 11/2009 |

OTHER PUBLICATIONS

European Patent Application No. 12879114.2, Search Report mailed Jan. 21, 2016.
Clausen, T., et al., "Optimized Link State Routing Protocol (OLSR)," Network Working Group, pp. 1-71, Oct. 2003.
He, Changhua et al., "Analysis of the 802.11i 4-Way Handshake," Proceedings of the 3rd ACM Workshop on Wireless Security, pp. 43-50, Oct. 2004.
Lee, Jae Woo et al, "z2z: Discovering Zeroconf Services Beyond Local Link," 2007 IEEE Globecom Workshops, pp. 1-7, Nov. 26, 2007.
Perkins, C., et al., "Ad hoc On-Demand Distance Vector (AODV) Routing," Network Working Group, pp. 1-35, Oct. 2003.
International Application No. PCT/US2008/061674, International Search Report and Written Opinion mailed Oct. 14, 2008.
International Application No. PCT/US2011/047591, International Search Report and Written Opinion mailed Dec. 19, 2011.
International Application No. PCT/US2012/059093, International Search Report and Written Opinion mailed Jan. 4, 2013.
Chirumamilla, Mohan K. et al., "Agent Based Intrustion Detection and Response System for Wireless LANs," CSE Conference and Workshop Papers, Paper 64, Jan. 1, 2003.
Craiger, J. Philip, "802.11, 802.1x, and Wireless Security," SANS Institute InfoSec Reading Room, Jun. 23, 2002.
Finlayson, Ross et al., "A Reverse Address Resolution Protocol," Nework Working Group, Request for Comments: 903 (RFC 903), Jun. 1984.
European Patent Application No. 11823931.8, Search Report mailed Aug. 29, 2016.

* cited by examiner

DISTRIBUTED CHANNEL SELECTION FOR WIRELESS NETWORKS

CROSS-REFERENCE TO RELATED APPLICATIONS

This application is a continuation of U.S. patent application Ser. No. 12/877,048, filed Sep. 7, 2010, entitled "DISTRIBUTED CHANNEL SELECTION FOR WIRELESS NETWORKS," which is incorporated herein by reference.

BACKGROUND

Background of the Invention

The invention relates to the field of wireless networking devices and specifically to systems and methods of configuring wireless networking devices to operate in close proximity to each other. Many organizations provide wireless networks to their users and/or the general public. Often, multiple wireless networking devices, such as wireless access points, are required to provide effective wireless network access to users over large physical area. For example, there may be large numbers of wireless access points operating together to provide wireless network access within one or more buildings, a campus, or even neighborhoods and cities.

Typically, wireless networking devices such as wireless access points communicate using one or more RF channels. As the physical density of wireless access points increases, interference between multiple wireless networking devices using the same or overlapping channels becomes more likely. As a result of channel interference from both other wireless network devices as well as other sources of radio interference, the network performance for users decreases.

One way to mitigate channel interference is to assign neighboring wireless networking devices to different or non-overlapping channels. Prior approaches have typically operated in a centralized manner or a distributed manner. Centralized approaches gather data from most or all of the wireless networking devices and use this complete view of the wireless network to determine a satisfactory assignment of channels to the wireless networking devices. The downsides of this approach are the need for a central entity to collect data from all of the networking devices, process network data, and determine channel assignments.

Distributed approaches to channel assignment rely on wireless networking devices to select an optimal channel for itself or to negotiate channel assignments between themselves. However, the former approach results in a sub-optimal channel assignment over the entire network and the latter approach requires the exchange of numerous messages between wireless networking devices. Additionally, this approach may take a long time to converge to a stable channel assignment. Furthermore, small changes in the RF environment may lead to a ripple effect, causing channel assignment changes across the entire wireless network.

BRIEF DESCRIPTION OF THE DRAWINGS

The invention will be described with reference to the drawings, in which.

BRIEF SUMMARY OF THE INVENTION

An embodiment of the invention assigns channels to wireless networking devices using a distributed technique that requires very little data to be exchanged between wireless networking devices. Additionally, an embodiment of the invention converges quickly to a stable channel assignment. In an embodiment, wireless networking devices scan for available channels and gather data about the channels and the RF environment. Using this information, each wireless networking device determines a cost value for each available channel and a quality value for its overall RF neighborhood. In an embodiment, each wireless networking device select the channel with the best cost value as a candidate channel for use. An arbiter is then used to resolve conflicts between wireless networking devices that have selected the same candidate channels.

If there is a device acting as arbiter, the wireless networking devices submit channel requests to the arbiter for approval. If two or more wireless networking devices are requesting the same channel at approximately the same time, in an embodiment of the invention, the arbiter assigns the channel to the wireless networking device with the worst RF neighborhood quality. The arbiter informs the wireless networking devices if their channel requests are approved. If a wireless networking device's channel request is not approved, the wireless networking device will rescan the remaining available channels to select a different candidate channel to be approved.

In an embodiment, if there is no arbiter device, a wireless networking device will listen for other networking devices using its desired candidate channel. If there are other networking devices using the same desired candidate channel, in an embodiment of the invention, the conflicting wireless networking devices exchange RF neighborhood quality information. Using this information, the wireless networking devices will yield the channel to the wireless networking device with the worst RF neighborhood quality.

DETAILED DESCRIPTION

Figure 1:
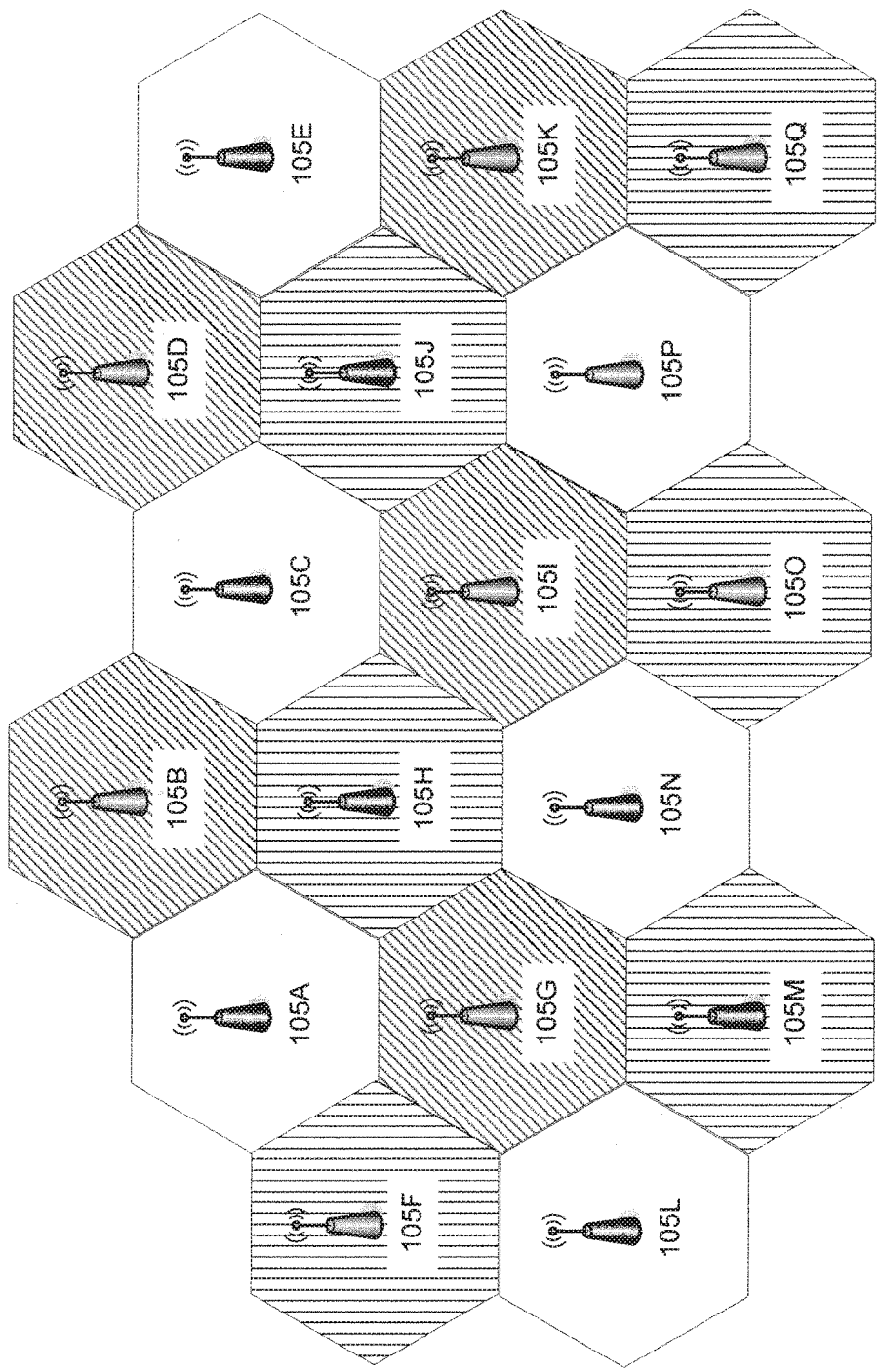
FIG. 1 illustrates an example wireless network channel assignment.

FIG. 1 illustrates an example of a wireless network 100 and its channel assignments. Wireless network 100 is comprised of multiple wireless access points and/or other wireless networking device 105 capable of providing wireless network connections to client devices, such as desktop, portable, and server computer systems; tablet computer systems; smartphones or other handheld devices; and/or other devices capable of using wireless network connections to communicate.

Example wireless network 100 includes wireless access points 105A, 105B, 105C, 105D, 105E, 105F, 105G, 105H, 105I, 105J, 105K, 105L, 105M, 105N, 105O, 105P, and 105Q. However, embodiments of the invention may be utilized in wireless networks including any arbitrary number of wireless access points and/or other wireless networking devices 105. In example wireless network 100, the wireless access points 105 may use any wireless networking technology and protocol known in the art, including one or more of the IEEE 802.11 family of wireless networking standards, Zigbee and the 802.15.4 wireless networking standard, Femtocell cellular networking using CDMA, GSM, WiMAX, LTE, and/or other cellular networking standards.

Although omitted from FIG. 1 for clarity, the wireless networking devices 105 may be connected with one or more local-area networks or wide-area networks via wired or wireless network connections. The local-area network and/or wide-area network may include network devices such as network hubs, network switches, network routers, multi-function network gateways, and software and/or hardware firewalls. In an embodiment, wireless network 100 may also include one or more wireless access point managers that control the configuration of the wireless access points 105. Wireless access point manager may facilitate the deployment of network policies, software and firmware upgrades, and configurations to wireless access points 105 and may monitor network usage by client devices via the wireless access points.

Example wireless network 100 includes three different wireless channels. Each channel is indicated by different shading in FIG. 1. As shown in FIG. 1, channels are assigned to wireless access points 105 to maximize the distance between different wireless access points using the same channel and thus minimize radio interference. Although example wireless network 100 uses three different wireless channels, embodiments of the invention may use any arbitrary number of channels, depending upon factors including as the total number of channels available in the wireless networking technology, channels in use by other devices outside of the control of the wireless network, and environmental RF interference with one or more of the available channels. For example, the IEEE 802.11 b/g standards has a total of 14 available channels; however only 11 of these channels are typically available in the United States. Additionally, the adjacent channels of these standards overlap, so that often there are only 3 or 4 non-overlapping channels available.

Figure 2:
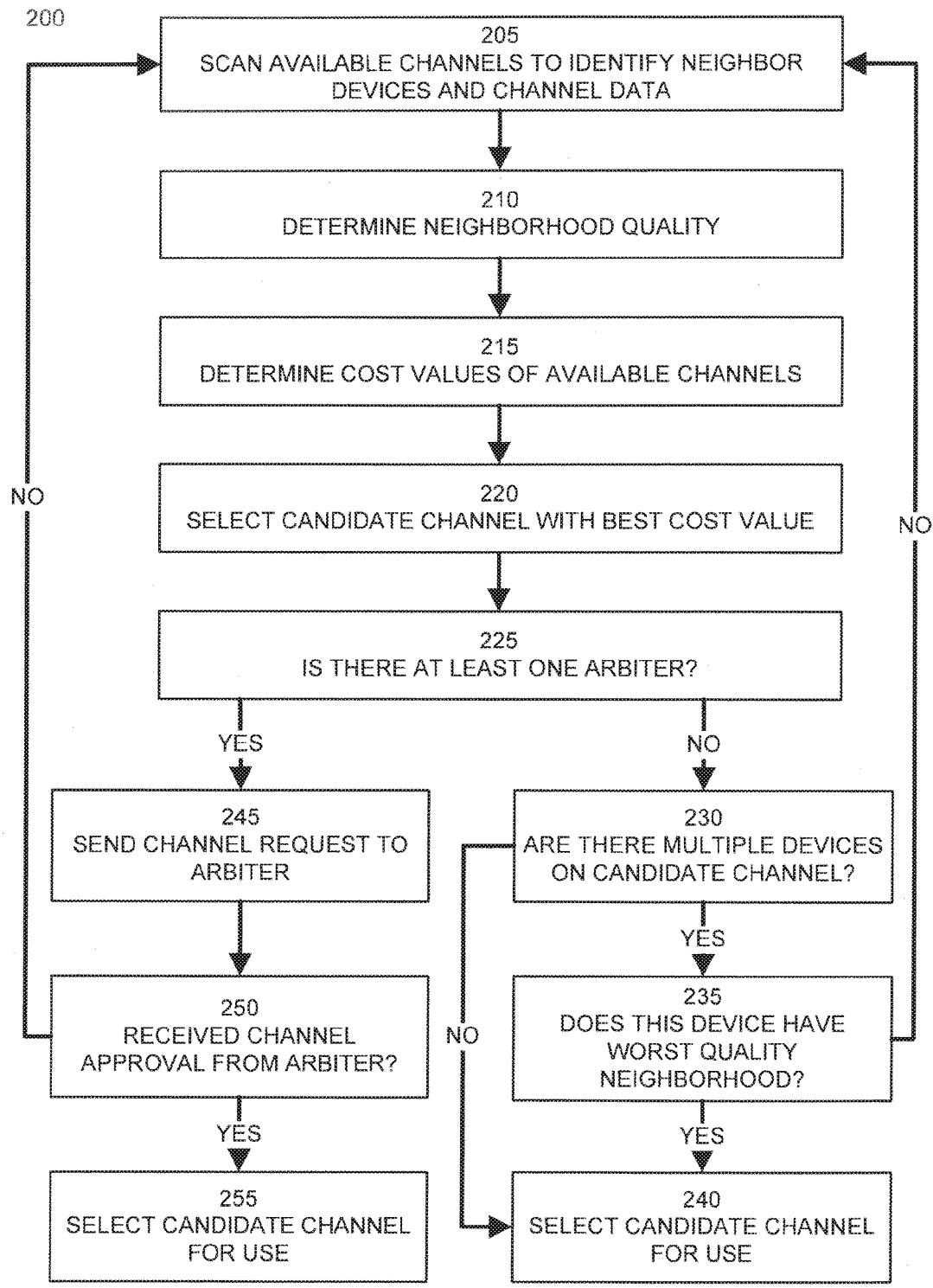
FIG. 2 illustrates a method of assigning channels to wireless networking devices according to an embodiment of the invention.

As discussed above, an embodiment of the invention uses a distributed technique for determining channel assignments in wireless networks with multiple wireless access points or other wireless networking devices. FIG. 2 illustrates a method 200 of assigning channels to wireless networking devices according to an embodiment of the invention. In embodiments of the invention, wireless networking devices such as a wireless access points each perform separate instances of method 200 independently of each other during their respective initializations.

In step 205, a wireless networking device scans all of the available wireless networking channels to identify any neighboring wireless access points and gather data about each wireless networking channel. Embodiments of the invention may scan available channels sequentially or randomly. In an embodiment, step 205 determines whether each channel is in use, and if so, the number of detected wireless access points using a given channel. An embodiment of step 205 may also measure quantitative attributes of each channel, including the user load, RF interference, transmission, reception, and/or total channel utilization; the noise floor; the PHY error rate; the TX or RX frame drop rate; the TX/RX bit rate usage and/or success distribution; the CRC error rate for each channel; and/or, if the channel is used by any detected neighboring wireless access points, the received signal strength indication (RSSI) or signal to noise ratio for each neighboring wireless access point using a given channel. An embodiment of step 205 may further determine qualitative attributes of each channel, including whether the channel overlaps with any other channel in use, whether the channel uses dynamic frequency selection (DFS), and/or whether the channel is being used indoors or outdoors.

Step 210 determines the quality of the RF neighborhood of the wireless networking device based on the data gathered in step 205. In an embodiment, the RF neighborhood quality is based on the average received signal strength of neighboring wireless networking devices. This may be determined by averaging the RSSI data for each channel, and then determining the average of this value over all of the available channels. Another embodiment of step 210 may use the lowest RSSI value of all the neighboring networking devices as a measure of RF neighborhood quality. Alternative embodiments of step 210 may incorporate other factors described above, such as RF interference or the number of neighboring wireless access points. In general, more neighboring wireless networking devices and/or stronger signals from neighboring wireless networking devices or other RF sources reduce the quality of the RF neighborhood.

Step 215 determines cost values for each of the available channels based on the data gathered in step 205. In an embodiment, step 215 determines the cost values using a cost function that takes into account some or all of the above-described. Embodiments of the invention may use any type of cost function known in the art to determine one or more cost values for each available channel. In an embodiment, the cost function of step 215 assigns an initial cost value to an available channel and then adds or subtracts from this initial cost value based on one or more of the above described factors. In another embodiment, step 215 determines a weighted sum of two or more of the above described factors. In still another embodiment, step 215 determines cost values based on the application of one or more Boolean operations on a parameter vector, where the parameter vector is based on the data gathered in step 205.

In still a further embodiment, the cost function of step 215 uses values derived from the measured or determined values of the above described factors, as opposed to the measured values themselves. For example, an embodiment of step 215 may assign each factor a positive or negative score or point value based on its measured value. Different score or point values may be assigned based on whether the measured value of the factor falls within a particular range of values or above or below one or more threshold values. For example, if a channel utilization of a channel is less than 10%, it may be assigned a point value of zero within the cost function. If the channel utilization of this channel is between 10% and 20%, this factor may be assigned a point value of +10 in the cost function.

An example cost function may be:

$$Cost = \left(\frac{1000}{N} - P_i\right) + C_{adj} + C_{overlap} + C_{power},$$

where N is the number of wireless access points or other wireless detected networking devices using the channel, C_adj is an addition or deduction of points based on a measurement of interference from neighboring wireless networking devices, C_overlap is an addition or deduction of points based on whether the channel overlaps with any other channel in use, and C_power is an addition or deduction of points based on whether there is a maximum power limit for the channel, for example due to FCC or other regulatory requirements.

Step 220 selects the channel with the best cost value as a candidate channel for use by this wireless networking device. Depending on the specific form of the cost function, the best cost value may either be the lowest cost value or the highest cost value.

Step 225 determines if there is at least one networking device designated as a arbiter that is accessible to the wireless networking device. In an embodiment, one or more of the wireless access points may be designated as an arbiter. A networking device acting as an arbiter is used to reduce or prevent channel conflicts from wireless networking devices using the same channels. In an embodiment, a networking device is manually selected as an arbiter by a network administrator. In another embodiment, a networking device is automatically assigned to act as an arbiter by the wireless networking devices within each other's RF coverage area. In yet another embodiment, a networking device is automatically assigned to act as an arbiter by the wireless networking devices that share the same backhaul network connection, such as an Ethernet network or switching network. In general, the wireless networking devices within each others RF range should use the same arbiter. For example, one networking device in a building may be designated as an arbiter.

If there is no networking device designated as an arbiter, method 200 proceeds to step 230. In step 230, the wireless networking device enters a listening mode and determines if there are any other warless networking devices using the selected candidate channel. If there are no other wireless networking devices using the candidate channel, method 200 proceeds to step 240 and selects the candidate channel for use by the wireless networking device.

Conversely, if step 230 determines that one or more other wireless networking devices are using the selected candidate channel, method 200 proceeds to step 235. In step 235, the wireless networking device exchanges messages with one or more other wireless networking devices using the selected candidate channel to determine which of these devices has the lowest quality RF neighborhood, based on the RF neighborhood quality measurement determined in step 210. If step 235 determines that the wireless networking device has the lowest RF neighborhood quality as compared with its neighboring wireless networking devices on the same channel, then method 200 proceeds to step 240 and the wireless network device is allowed to use the selected candidate channel. All of the other neighboring wireless networking devices will yield this selected candidate channel to the wireless networking device, since they have received messages from the wireless networking device indicating that this wireless networking device has a lower RF neighborhood quality. In the event of a tie between two or more wireless networking devices with the same RF neighborhood quality, the channel may be assigned to one of the tied wireless networking devices based on arbitrary criteria or attributes, such as the MAC addresses of the wireless networking devices.

If step 235 determines that the wireless networking device does not have the lowest RF neighborhood quality, method 200 proceeds back to step 205 to rescan for available channels. In an embodiment, the wireless networking device maintains a list of channels assigned to other wireless networking devices in previous iterations of method 200, so that these channels can be skipped during rescanning. This decreases the amount of time required for rescanning and hence decreases the convergence time to assign channels to all of the wireless networking devices. The wireless networking device may repeat steps 205 through 255 any arbitrary number of times until it finds a channel to use.

Returning to step 225, if the wireless networking device detects at least one networking device acting as an arbiter, method 200 proceeds to step 245. Step 245 sends a channel request message to the arbiter. In an embodiment, the channel request message identifies the selected candidate channel. In a further embodiment, the channel request message includes additional data such as the neighborhood quality measurement and/or the wireless network devices cost value for the selected candidate channel.

In an embodiment, the networking device acting as the arbiter receives channel request messages from one or more wireless networking devices requesting a given channel, and decides which of these wireless networking devices should be assigned to requested channel. In an embodiment, the arbiter compares the RF neighborhood quality measurements received with each channel request message associated with a given channel and grants the requested channel to the wireless networking device with the lowest quality RF neighborhood. In another embodiment, the arbiter compares the channel cost values of a given candidate channel from each wireless networking device requesting this channel and grants the requested candidate channel to the wireless networking device with the highest channel cost value.

In the event of a tie between two or more wireless networking devices, the arbiter may arbitrarily assign the channel to one of the tied networking devices. In other embodiments, the arbiter may use each wireless networking device's cost value associated with the requested channel to determine the channel assignment. In a further embodiment, because the wireless networking devices perform separate instances of method 200 in parallel but asynchronously, an arbiter may wait for a time period, such as 15 seconds, after receiving the first request for any given channel to allow time for other wireless networking devices to request. The arbiter then assigns the requested channel to one of the wireless networking devices that sent a request during this time period, such as the wireless networking device with the worst RF neighborhood quality.

In response to one or more channel request messages, the arbiter assigns the requested channel to one of the requesting wireless networking devices. The arbiter then sends a channel approval message to the wireless networking device assigned to the requested channel and optionally sends channel denied messages to the other wireless networking devices that had requested this channel at approximately the same time.

In step 250, the wireless networking device determines if it has received a channel approval message from the arbiter for the selected candidate channel. If so, then method 200 proceeds to step 255, which selects the candidate channel for use by the wireless networking device.

Conversely, if the wireless networking device determines in step 250 that it has received a channel denied message or no response message at all from the arbiter, then method 200 proceeds back to step 205 to rescan for available channels and select a different candidate channel. The wireless networking device may repeat steps 205 through 255 any arbitrary number of times until it finds a channel to use.

In some situations, the RF environment and channel utilization associated with the wireless network may change due to the introduction of interference. In an embodiment, each wireless networking device monitors the RF environment associated with the channel it is using. If one or more parameters of the RF environment change substantially, the wireless networking device may drop its current channel and repeat method 200 to select a different channel. For example, if the interference utilization and/or the CRC error rate of a channel increase above absolute or relative thresholds, the wireless networking device drops its current channel and repeats method 200 to select a different channel.

In a further embodiment, the channel assignment process for all of the wireless networking devices in the wireless network may be repeated at regular intervals, such as during scheduled downtime. This allows the channel assignments to be determined from a clean initial state based on the current network configuration and RF environment. Often scheduled downtime may be during off-hours, such as late at night, so that users are not disrupted. However, the RF environment during off-hours may not be the same as that during normal operating hours. To produce channel assignments that more accurately reflect the RF environment during normal operating hours, yet a further embodiment of the invention records RF environment information during normal operating hours. During scheduled downtime, this embodiment of the invention performs method 200 as described above, but using the previously recorded RF environment information, rather than information about the current off-hour RF environment.

As discussed above, the wireless networking devices 105 in FIG. 1 may be connected with one or more local-area networks or wide-area networks via wired or wireless network connections. The wired or wireless network connections between the wireless networking devices and the one or more local-area networks or wide-area networks are referred to as backhaul network connections. If the backhaul network connection of one or more wireless networking devices 105 is a wireless network connection, an embodiment of the invention may use a modified version of method 200 to select the channel for the backhaul network connection. In this embodiment of method 200, step 205 scans the available channels to identify if there is an existing mesh channel as well as to determine the neighboring wireless networking devices and channel data. Steps 210 through 220 are performed as described above. If a mesh channel is found, then the wireless networking device joins the mesh channel. If there is no current mesh channel, then the wireless networking device selects the channel with the best cost value as the mesh channel.

In an further embodiment the cost function used to select a candidate channel may be specified via a management interface. Additionally, the management interface may be used to display statistics about the wireless network and the wireless networking devices, such as the values of cost function and/or the factors contributing to the cost function.

Figure 3:
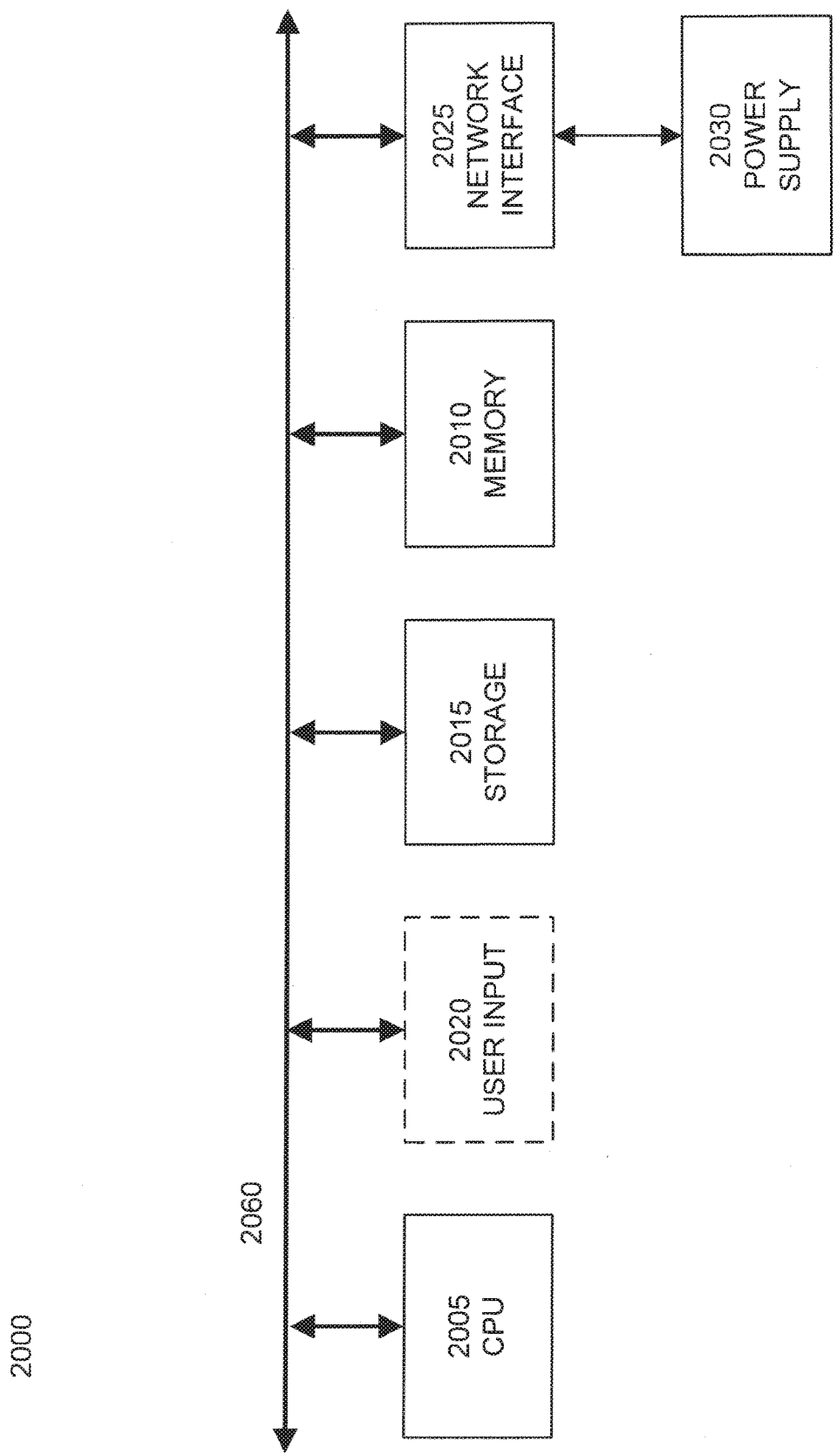
FIG. 3 illustrates a computer system suitable for implementing all or a portion of embodiments of the invention.

FIG. 3 illustrates a computer system 2000 suitable for implementing all or a portion of embodiments of the invention. FIG. 3 is a block diagram of a computer system 2000, such as a personal computer or other digital device, suitable for practicing an embodiment of the invention. Embodiments of computer system 2000 include dedicated networking devices, such as wireless access points, network switches, hubs, routers, hardware firewalls, network traffic optimizers and accelerators, network attached storage devices, and combinations thereof Computer system 2000 includes a central processing unit (CPU) 2005 for running software applications and optionally an operating system. CPU 2005 may be comprised of one or more processing cores. Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, HD-DVD, or other magnetic, optical, or solid state storage devices. Memory 2010 may store a firmware image comprising applications and data adapted to be executed by computer system 2000.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 2000 may also include a wired networking interface, such as one or more Ethernet connections to communicate with other networking devices via local or wide-area networks. In a further embodiment, computer system 2000 may be capable of receiving some or all of its required electrical power via the network interface 2025, for example using a wired networking interface power over Ethernet system.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

A power supply 2030 provides electrical power to the computer system 2000. Power supply 2030 may be adapted to draw electrical power from a connection with an electrical power distribution grid. In an embodiment, power supply 2030 is connected with network interface 2025 to draw electrical power for computer system 2000 from one or more wired network connections using a network power standard, such as IEEE 802.3af.

Although embodiments of the invention are discussed with reference to the IEEE 802.11 standard, embodiments of the invention are equally applicable to other standard and proprietary wireless network protocols. Additionally, embodiments of the invention are not limited to 802.11 wireless network connections and may be utilized for any type of communication network where a network connection between a client wireless network device and a wireless network device is required.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention. The specification and drawings are, accordingly, to be regarded in an illustrative rather than a restrictive sense. It will, however, be evident that various modifications and changes may be made thereunto without departing from the broader spirit and scope of the invention as set forth in the claims.

We claim:

1. A method comprising:
   identifying, by a wireless networking device, channel data of available wireless network channels;
   identifying, by the wireless networking device, neighboring wireless networking devices;
   determining neighborhood qualities of the neighboring wireless networking devices;
   determining cost values for the available wireless network channels based on a cost function of at least one attribute of the available wireless network channels from the channel data;
   selecting a candidate wireless network channel of the available wireless network channels based on the cost values for the available wireless network channels;
   determining, by the wireless networking device, if at least one of the neighboring wireless networking devices is acting as an arbiter network device;
   if it is determined that at least one of the neighboring wireless networking devices is acting as the arbiter networking device:
      sending a channel request to use the candidate wireless network channel to the arbiter networking device;
      using the candidate wireless network channel to transmit data if channel approval is received from the arbiter networking device,
   if it is determined that all of the neighboring wireless networking devices are failing to act as the arbiter networking device, determining whether to use the candidate wireless network channel based on the determined neighborhood qualities of the neighboring wireless networking devices.

2. The method of claim 1, wherein if it is determined that none of the neighboring wireless networking devices is acting as the arbiter networking device, the method further comprises:
   indicating whether one or more neighboring wireless networking devices are using the candidate wireless network channel;
   determining whether to use the candidate wireless network channel based on the indication whether the one or more neighboring wireless networking devices are using the candidate wireless network channel.

3. The method of claim 2, wherein if it is determined that no neighboring wireless networking devices are using the candidate wireless network channel, then determining to use the candidate wireless network channel.

4. The method of claim 2, further comprising:
   comparing an RF quality of the wireless networking device with an RF neighborhood quality of the one or more neighboring wireless networking devices using the candidate wireless network channel;
   determining to use the candidate wireless network channel based on the comparison of the RF quality of the wireless networking device with the RF neighborhood quality of the one or more neighboring wireless networking devices using the candidate wireless network channel.

5. The method of claim 1, wherein the channel data includes one or a combination of user load of a wireless network channel, RF interference, transmission utilization, reception utilization, total channel utilization, a noise floor, a PHY error rate, a transmission frame drop rate, a reception frame drop rate, transmission bit rate usage, reception bit rate usage, CRC error rate for the candidate wireless network channel, neighboring wireless access points using the candidate wireless network channel, and the received signal strength indication (RSSI) for the neighboring wireless access points using the candidate wireless network channel.

6. The method of claim 1, wherein the neighborhood qualities of the neighboring wireless networking devices are determined based on an average RSSI of the neighboring wireless networking devices.

7. The method of claim 6, wherein the average RSSI of the neighboring wireless networking devices is determined by averaging the RSSI of the neighboring wireless networking devices across a plurality of wireless network channels used by the neighboring wireless networking devices.

8. The method of claim 1, wherein the neighborhood qualities of the neighboring wireless networking devices are determined based on a lowest RSSI of the neighboring wireless networking devices.

9. The method of claim 1, wherein the cost function includes assigning an initial cost value to the available wireless network channels and adding or subtracting from the initial cost value based on the at least one attribute of the available wireless network channels.

10. The method of claim 1, wherein the cost value is a weighted sum of attributes of the available wireless network channels.

11. A system comprising:
   neighboring wireless networking devices;
   a wireless networking device configured to:
      identify channel data of available wireless network channels;
      identify the neighboring wireless networking devices;
      determine neighborhood qualities of the neighboring wireless networking devices;
      determine cost values for the available wireless network channels based on a cost function of at least one attribute of the available wireless network channels from the channel data;
      select a candidate wireless network channel of the available wireless network channels based on the cost values for the available wireless network channels;
      determine if at least one of the neighboring wireless networking devices is acting as an arbiter network device;
      send a channel request to use the candidate wireless network channel to the arbiter networking device, if it is determined that at least one of the neighboring wireless networking devices is acting as the arbiter networking device;
      use the candidate wireless network channel to transmit data if channel approval is received from the arbiter networking device;
      determine whether to use the candidate wireless network channel based on the determined neighborhood qualities of the neighboring wireless networking devices, if it is determined that all of the neighboring wireless networking devices are failing to act as the arbiter networking device.

12. The system of claim 11, wherein if it is determined that none of the neighboring wireless networking devices is acting as the arbiter networking device, the wireless networking device is further configured to:

indicate whether one or more neighboring wireless networking devices are using the candidate wireless network channel;

determine whether to use the candidate wireless network channel based on the indication whether the one or more neighboring wireless networking devices are using the candidate wireless network channel.

13. The system of claim 12, wherein if it is determined that no neighboring wireless networking devices are using the candidate wireless network channel, the wireless networking device is further configured to determine to use the candidate wireless network channel.

14. The system of claim 12, wherein the wireless networking device is further configured to:

compare an RF quality of the wireless networking device with an RF neighborhood quality of the one or more neighboring wireless networking devices using the candidate wireless network channel;

determine to use the candidate wireless network channel based on the comparison of the RF quality of the wireless networking device with the RF neighborhood quality of the one or more neighboring wireless networking devices using the candidate wireless network channel.

15. The system of claim 11, wherein the channel data includes one or a combination of user load of a wireless network channel, RF interference, transmission utilization, reception utilization, total channel utilization, a noise floor, a PHY error rate, a transmission frame drop rate, a reception frame drop rate, transmission bit rate usage, reception bit rate usage, CRC error rate for the candidate wireless network channel, neighboring wireless access points using the candidate wireless network channel, and the received signal strength indication (RSSI) for the neighboring wireless access points using the candidate wireless network channel.

16. The system of claim 11, wherein the wireless networking device is further configured to determine the neighborhood qualities of the neighboring wireless networking devices based on an average RSSI of the neighboring wireless networking devices.

17. The system of claim 16, wherein the wireless networking device is further configured to determine the average RSSI of the neighboring wireless networking devices by averaging the RSSI of the neighboring wireless networking devices across a plurality of wireless network channels used by the neighboring wireless networking devices.

18. The system of claim 11, wherein the wireless networking device is further configured to determine the neighborhood qualities of the neighboring wireless networking devices based on a lowest RSSI of the neighboring wireless networking devices.

19. The system of claim 11, wherein the cost function includes assigning an initial cost value to the available wireless network channels and adding or subtracting from the initial cost value based on the at least one attribute of the available wireless network channels.

20. A system comprising:

means for identifying channel data of available wireless network channels;

means for identifying neighboring wireless networking devices;

means for determining neighborhood qualities of the neighboring wireless networking devices;

means for determining cost values for the available wireless network channels based on a cost function of at least one attribute of the available wireless network channels from the channel data;

means for selecting a candidate wireless network channel of the available wireless network channels based on the cost values for the available wireless network channels;

means for determining if at least one of the neighboring wireless networking devices is acting as an arbiter network device;

means for sending a channel request to use the candidate wireless network channel to the arbiter networking device, if it is determined that at least one of the neighboring wireless networking devices is acting as the arbiter networking device;

means for using the candidate wireless network channel to transmit data if channel approval is received from the arbiter networking device;

means for determining whether to use the candidate wireless network channel based on the determined neighborhood qualities of the neighboring wireless networking devices, if it is determined that all of the neighboring wireless networking devices are failing to act as the arbiter networking device.

* * * * *